(12) United States Patent
Garcia Robles et al.

(10) Patent No.: US 7,353,037 B2
(45) Date of Patent: Apr. 1, 2008

(54) SYSTEM AND METHOD OF ACCESSING MOBILE PHONE NETWORK SUBSCRIBER INFORMATION FROM THE TCP/IP NETWORK

(75) Inventors: Ana Garcia Robles, Madrid (ES); Carlos De La Fuente Salcedo, Madrid (ES); Juan Miguel Santos Hidalgo, Merida-Badajoz (ES)

(73) Assignee: Vodaphone Group PLC (GB)

( * ) Notice: Subject to any disclaimer, the term of this patent is extended or adjusted under 35 U.S.C. 154(b) by 0 days.

(21) Appl. No.: 10/491,737

(22) PCT Filed: Oct. 3, 2002

(86) PCT No.: PCT/ES02/00464

§ 371 (c)(1),
(2), (4) Date: May 21, 2004

(87) PCT Pub. No.: WO03/030565

PCT Pub. Date: Apr. 10, 2003

(65) Prior Publication Data

US 2004/0259579 A1 Dec. 23, 2004

(30) Foreign Application Priority Data

Oct. 3, 2001 (ES) ............................. 200102211

(51) Int. Cl.
*H04Q 7/20* (2006.01)
*H04L 12/54* (2006.01)

(52) U.S. Cl. ....................................... 455/517; 370/401
(58) Field of Classification Search ................ 455/433, 455/456.1, 560, 404.1, 445, 436, 426.1, 466, 455/404.2, 422.1; 370/401, 466, 364, 395.1
See application file for complete search history.

(56) References Cited

U.S. PATENT DOCUMENTS

| 6,594,258 | B1 * | 7/2003 | Larson et al. ................ 370/353 |
| 2004/0053629 | A1 * | 3/2004 | Rueger et al. ............... 455/466 |
| 2004/0116120 | A1 * | 6/2004 | Gallagher et al. ........... 455/436 |
| 2004/0203849 | A1 * | 10/2004 | Allison et al. ............ 455/456.1 |
| 2005/0003797 | A1 * | 1/2005 | Baldwin .................. 455/404.1 |

FOREIGN PATENT DOCUMENTS

| EP | 1 009 175 | 6/2000 |
| WO | WO 98 44747 | 10/1998 |
| WO | WO 00 67446 | 11/2000 |
| WO | WO 00 74409 | 12/2000 |

* cited by examiner

*Primary Examiner*—Naghmeh Mehrpour
(74) *Attorney, Agent, or Firm*—Ostrolenk, Faber, Gerb & Soffen, LLP

(57) ABSTRACT

A machine (1) in the TCP/IP network (2) performs a request regarding a consultation or modification of at least one mobile telephone network subscriber parameter; it is characterized in that it comprises means (5) for receiving the request made and means (5) for extracting the parameters included in said request and which are necessary for being able to attend to it. It comprises storage means (7) of at least one parameter pertaining to the different mobile telephone network subscribers (3) and means for sending the response to the request made in order to obtain and send the obtained information in the case that the request made is a consultation regarding the stored parameter. It comprises means (6, 8, 9 and 10) for obtaining the necessary mobile telephone network parameters so that the request is attended to by said mobile telephone network (3) in order to make the request to the network (3) when the request made is not contained in the means (7).

It allows making consultations or modifications of the network (3) subscriber parameters through the machine (1).

24 Claims, 2 Drawing Sheets

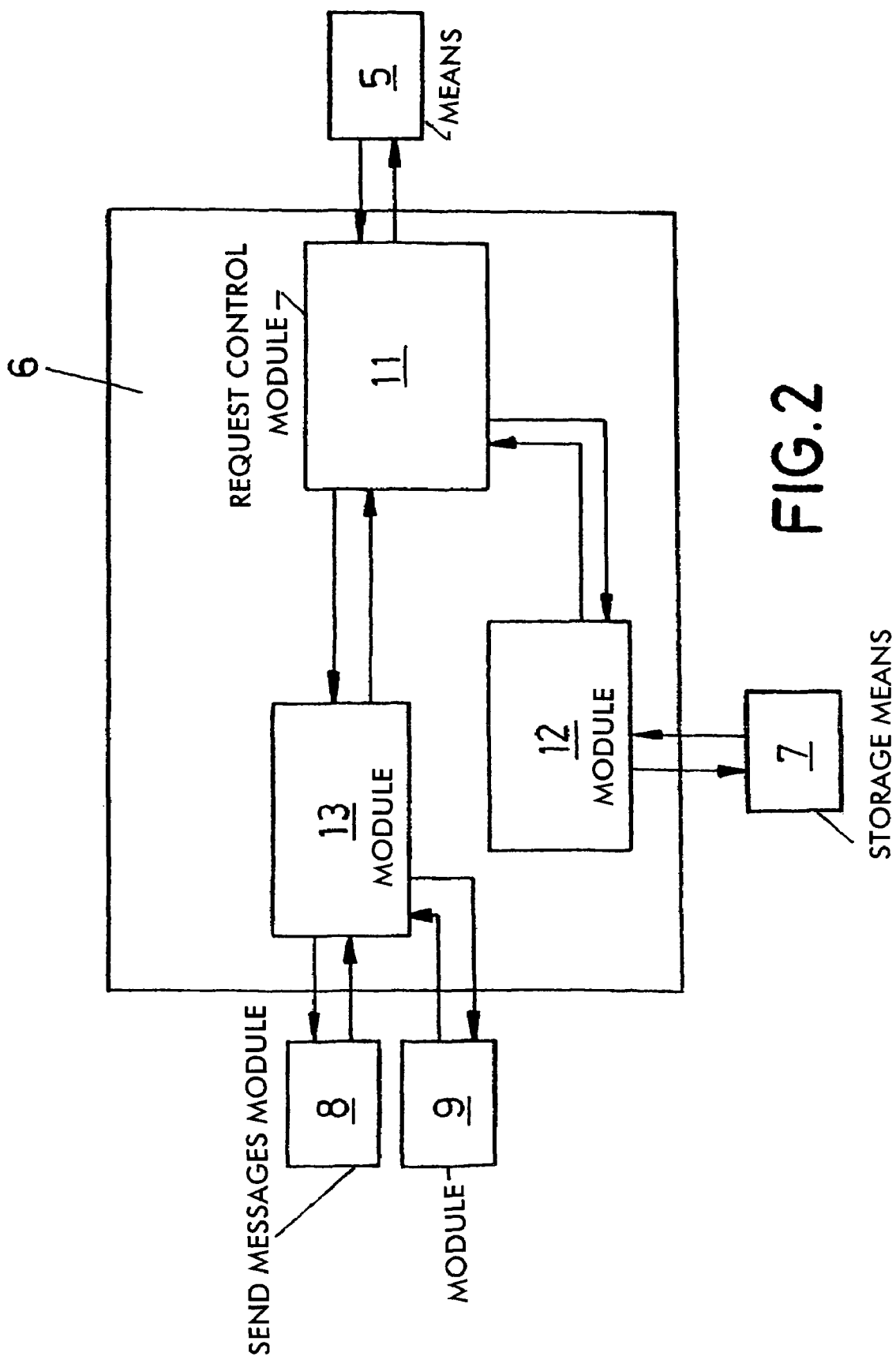

SYSTEM AND METHOD OF ACCESSING MOBILE PHONE NETWORK SUBSCRIBER INFORMATION FROM THE TCP/IP NETWORK

OBJECT OF THE INVENTION

The present invention consists of a system and process for accessing mobile telephone network subscriber information from the TCP/IP network, which has the object of allowing for real time access to the subscriber information contained in the mobile telephone network, by means of network applications that are different from those of the mobile telephone network itself and all this in a way that the access is simple for the subscriber, as if it were a question of accessing a conventional data base.

BACKGROUND OF THE INVENTION

In a mobile telephone network, subscriber information is stored in a node of said network called HLR (Home Location Register; data register of a set of mobile service users). Network user data is stored in said node, such as their IMSI (International Mobile Subscriber Identification), MSISDN (Mobile Station International ISDN Number using the E.164 numbering plan) and the VLR (Visitor Location Register), which is updated every time a new user enters in a new area.

It is becoming more and more necessary to have real time access to the information contained in the HLR's by means of applications (network elements) for networks which are different from those of the mobile telephone network itself. Currently, the manner of accessing this information from an outside network, specifically from the TCP/IP network, is through provisioning interfaces and O&M, which are the interfaces through which all subscriber parameters are introduced in an HLR, which have the drawback of being unable to handle a large number of requests in real time.

In the State of the Art, accessing this information is also known by means of protocol converters, which only convert messages from one protocol to another, it is thereby necessary to know what processes the network follows.

DESCRIPTION OF THE INVENTION

In order to solve the aforementioned drawbacks, the invention has developed a new system and process for accessing mobile telephone network subscriber information from the TCP/IP network, wherein a mobile telephone network subscriber accesses a service which in turn accesses a machine in the TCP/IP network in order to make a request concerning a consultation or modification of at least one mobile telephone network subscriber parameter, said machine directing the request towards the mobile telephone network.

The system of the invention is characterized in that it comprises means for receiving the request made by the machine in the TCP/IP network and means for extracting the parameters included in said request, which are necessary for attending to said request.

The system of the invention furthermore comprises storage means for at least one parameter pertaining to the different mobile telephone network subscribers and means for sending the response to the request made in order to obtain and send the information regarding said parameter to the machine in the TCP/IP network in the case that the request made is a consultation concerning said at least one stored parameter.

Therefore, by means of the system of the invention, the consultation can be made directly with said system without the necessity of accessing the mobile telephone network.

Another fundamental feature of the system of the invention consists of having foreseen means for obtaining the necessary mobile telephone network parameters in order for the request to be attended to by said mobile telephone network, such that when the request made is not contained in the storage means for the at least one parameter pertaining to the different mobile telephone network subscribers, the system makes the request to said mobile telephone network.

The means for obtaining the necessary mobile telephone network parameters in order for the request to be attended to by said mobile telephone network comprise a request management module by means of which it is detected when the request that has been made cannot be attended to by the storage means of at least one parameter pertaining to the different mobile telephone network subscribers, and after said detection it generates a conventional routing obtainment message of a mobile telephone network message in order to access a node of the mobile telephone network in which the subscriber is registered, such that in response to the generated message, this node sends the routing parameters, including part of the necessary parameters, so that the request can be attended to by the mobile telephone network.

Furthermore, the means for obtaining the necessary mobile telephone network parameters in order for the request to be attended to by said mobile telephone network comprise a compose and send message module as well as a module for receiving and breaking down messages to the mobile telephone network, in order to send and receive the different messages of said mobile telephone network.

In an embodiment of the invention, the routing obtainment message of a message in the mobile telephone network is a routing obtainment message of a short message (srifsm), by means of which the HLR node of the mobile telephone network is accessed. In this message, the system of the invention puts the address of the system so that the HLR sends it the necessary mobile telephone network parameters in order to access it. Therefore, by generating the srifsm signal, the system passes itself off as a short message service center (SMSC), the HLR node thereby permits carrying out access and in response, sends it part of the necessary parameters for accessing the network.

In another embodiment of the invention, the means for obtaining the mobile telephone network parameters directly receive these parameters by means of a mechanism foreseen in the mobile telephone network itself, which has previously been implemented in said network.

Furthermore, from the parameters obtained by the system, the means for obtaining the necessary mobile telephone network parameters so that the request is attended to by said mobile telephone network acquire the identity of a node in the mobile telephone network with the authority to access the node of the mobile telephone network in which the subscriber is registered in order to allow consulting or modifying at least one mobile telephone network subscriber parameter in said node in which the subscriber is registered, all this from the means for obtaining the mobile telephone network parameters.

In an embodiment, the mobile telephone network node identity acquired by the means for obtaining the mobile telephone network parameters is that of the VLR in which the subscriber is registered.

With regard to the means for receiving the request made by the machine in the TCP/IP network and the means for extracting the necessary parameters in order to attend to said request, they are determined by at least one protocol interface.

In an embodiment of the invention, a protocol interface has been foreseen for each one of the protocols foreseen in the TCP/IP network for receiving and extracting the parameters according to the different protocols used in the TCP/IP network.

The request management module comprises a request control module which collects the parameters provided by the parameters extraction means, and it furthermore constitutes the means for sending the response to the made request to the protocol interface module. Furthermore, the request management module has a module for requests to the storage means for al least one parameter pertaining to the different mobile telephone network subscribers in order to obtain the at least one parameter when the request concerns a consultation of said parameter.

It is worth mentioning that the request management module also comprises a module for requests to the mobile telephone network in order to carry out said request to the mobile telephone network after receiving a request order from the request control module, said request being carried out through the means for composing and sending messages to the mobile telephone network.

In an embodiment of the invention, the consulted or changed subscriber parameters are stored in the storage means of at least one parameter pertaining to the different mobile telephone network subscribers. Said storage is maintained for a certain, pre-established time period.

In order to obtain proper system functioning, it is provided with a configuration directory which stores the necessary configuration data for its proper functioning.

It is possible that the parameters sent by the machine in the TCP/IP network contain information regarding if it should access the storage means of at least one parameter pertaining to the different mobile telephone network subscribers or if it should directly access said mobile telephone network, such that after extracting the request parameters, the request control module knows where the request is to be made.

Obviously, as has been described, in the case that the request made contains no information regarding whether to access the storage means of at least one parameter pertaining to the different mobile telephone network subscribers or the mobile telephone network directly, the request management module first accesses the storage means of at least one parameter pertaining to the different mobile telephone network subscribers, and if it cannot obtain information from these means, it then accesses the mobile telephone network in the previously described manner.

A process is deduced from the disclosed system, characterized in that from the request made by the machine in the TCP/IP network, the parameters included in said request are extracted, and storage means of at least one parameter pertaining to the different mobile telephone network subscribers are selectively accessed in order to obtain and send the information regarding said parameter to the machine in the TCP/IP network in the case that the request made is a consultation regarding said at least one stored parameter; or the mobile telephone network is accessed when the request made is not contained in the storage means of the at least one parameter pertaining to the different mobile telephone network subscribers.

For accessing the mobile telephone network, the mobile telephone network parameters are obtained by means of acquiring the identity of an SMSC, a routing obtainment message for a short message (srifsm) is therefore generated in order to access the mobile telephone network HLR node, putting the system's address in said srifsm message, so that the HLR node responds by means of sending said parameters to the system, the latter receiving the parameters, from which the identity is acquired of the VLR node in which the mobile telephone network subscriber is registered in order to allow consulting or modifying at least one parameter of the mobile telephone network in said HLR node.

In order to acquire the identity of the VLR node, the address of the VLR in which the subscriber is registered, which was previously received from the HLR, is sent at a MAP protocol level (mobile application part, which is a standardized protocol using messages so that calling or sending messages through the mobile telephone network is successfully carried out), and in the scope of the SCCP protocol (signal connection control part), which is a standardized protocol used for transferring information between specialized centers and central stations in a system with SS7 signaling (signaling system number 7, a signaling system used by the mobile telephone network switching centers for exchanging necessary information for controlling and supervising the connections between switching centers), the address is placed of the one which is intended to send the response to the request made, sending the result of the request made to the machine in the TCP/IP network.

It is also worth mentioning that obtaining the necessary mobile telephone network parameters for the request to be attended to by said mobile telephone network is directly carried out by means of a pre-established mechanism foreseen in the mobile telephone network.

Therefore, by means of the system and process of the invention, the consultation or modification of at least one parameter of the mobile telephone network is performed in real time without said mobile telephone network subscriber being aware of it, since, according to the process and system of the invention, the TCP/IP machine performs the access as if it were a conventional data base.

In order to aid in better understanding this specification and forming an integral part thereof, a set of drawings are attached below which, with an illustrative and non-limiting character, show the object of the invention.

BRIEF DESCRIPTION OF THE DRAWINGS

FIG. 2.—Shows a functional block diagram of the request management module shown in the previous figure.

DESCRIPTION OF THE PREFERRED EMBODIMENT

Figure 1:
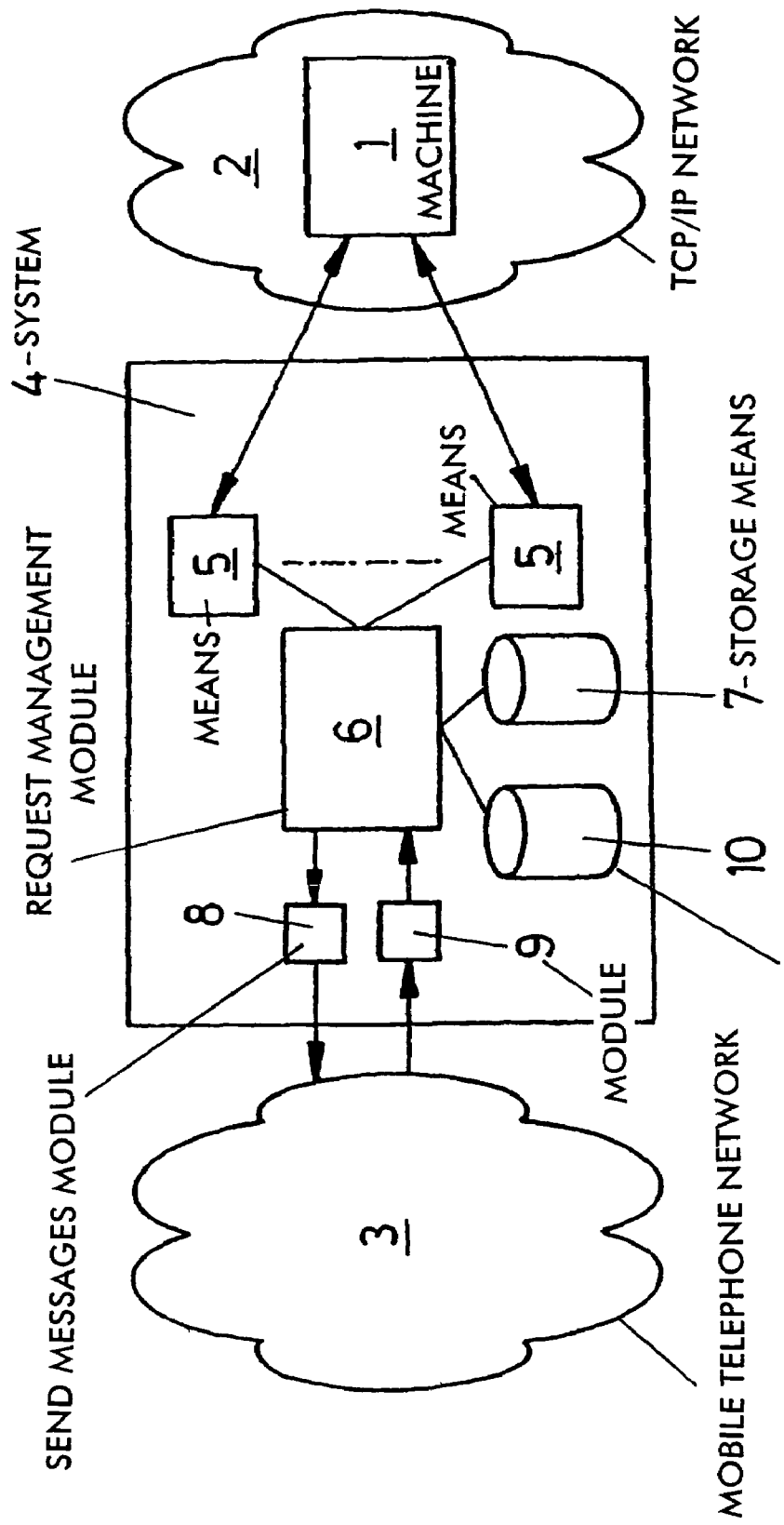
FIG. 1.—Shows a functional block diagram of a possible embodiment example of the system of the invention connected to the mobile telephone network and the TCP/IP network.

A description of the invention is made below based on the aforementioned figures.

It is known that a mobile telephone network 3 subscriber accesses a service which accesses a machine 1 in the TCP/IP network 2 in order to make a request regarding a consultation or modification of at least one subscriber parameter, such as, for example, consulting or modifying one of the services offered by the mobile telephone network, but as previously mentioned in the section on the background of the invention, this is not performed in real time in addition to the fact that it does not accept a large number of requests.

In order to allow real time access, the system 4 of the invention has a protocol interface 5 for each one of the protocols foreseen in the TCP/IP network, such that the system can be understood in any of the protocols used in said network 2, therefore, there is a protocol interface 5 for each one of the protocols used in the TCP/IP network 2.

The protocol interfaces 5 are connected to a request management module 6, which in turn is connected to a cache memory 7, to a compose and send messages module 8 and to a receive and break down messages module 9. In order for the system to properly function, a configuration directory 10 has been foreseen which is a data base where the necessary configuration data is stored for proper system 4 functioning.

Thus, the protocol interface 5 corresponding to the protocol used in the network 2 extracts the information from the request of the necessary parameters for attending to said request and passes it on to the request management module 6. Furthermore, said protocol interface 5 is responsible for composing the response in the corresponding protocol and sending it to the machine in the TCP/IP network 1.

In a preferred embodiment of the invention, the content of the request made by the machine 1, previously received from the service to which the mobile telephone network subscriber is accessing, comprises the following parameters:

Request receiver identifier, i.e., the system 4 identifier.
Request emitter identifier, i.e., the identifier of the machine 1 through which the request is made.
Request identifier necessary for relating a request to a response.
The subscriber for whom the request is made.
The desired operation to be carried out (for example, consulting subscriber parameters or changing parameters in supplementary services).
If the request is made by first consulting the cache memory 7 or is made directly to the mobile telephone network 3.
The necessary parameter or parameters depending on the operation to be carried out; for example, if the intention is to carry out a consultation operation, the necessary parameters are those which are being consulted, with the indication of if it is to go to the cache 7 or directly to the mobile telephone network 3; or in the case of wishing to carry out a supplementary service parameter change, with the indication of what supplementary service parameter is to be changed.

The cache memory 7 is a data base that stores the subscriber data that is consulted or changed, and in an embodiment of the invention, it has a data model with a tree configuration and furthermore, each time a request is made, the data is updated and stored for a certain period of time, i.e. it has a determined expiration.

Thus, when the consultation to be made indicates that it is to first be carried out in the cache memory 7, the request management module 6 accesses the former in order to obtain the data of the requested parameter and sends the response to the corresponding protocol interface so that, as previously mentioned, the latter sends the response to the machine 1 in the TCP/IP network 2, which in turn sends the result of the consultation to the service that carried it out.

In order to perform this functionality, the request management module 6 has a request control module 11 connected to the cache memory 7 through a module 12 for requests to the cache in order to allow the aforementioned access.

When accessing the cache 7, if the parameter to be consulted is not found, or if the previously mentioned different parameters sent by the subscriber indicate to directly access the mobile telephone network in order to make the request, this is detected by the request control module 11 that sends an order to a module 13 for requests to the mobile telephone network, forming part of the request management module 6 (FIG. 2).

When it should happen that the mobile telephone network 3 is to be accessed in order to attend to the subscriber's request, the request module 13 is responsible for making the request to the mobile telephone network 3 through the compose and send messages module 8, which composes and sends the message indicated by the request module 13 in order to access the network.

Consulting the mobile telephone network 3 begins when the request control module 11 sends to the request module 13 the order to make a request to the mobile telephone network 3, thereby providing the necessary information to do so (subscriber for whom the request is made, operation to be carried out and necessary parameters for attending to the request).

In order to make the request to the mobile telephone network 3, it is necessary to obtain the parameters of said network 3 in order to be able to access the information contained therein. To do so, the system 4 takes on the identity of an SMSC by means of sending an srifsm message (Send Routing Info For Short Messages) which is the message typically used for an SMSC to consult an HLR, which responds to said received message by obtaining the routing information for the short message.

It is worth mentioning that by sending the srifsm message to the network, the portability is consulted by means of the latter, i.e., it is capable of distinguishing if a subscriber is from another network, the system of the invention will thereby send the message through an STP (Signaling Transfer Point), which is the network node responsible for transferring all network signaling and is therefore responsible for routing the message to the corresponding destination, i.e. to the HLR that can attend to the routing request for a short message, as is conventionally performed.

Furthermore, in order to allow the system 4 of the invention to receive the routing information pertaining to the network parameters after taking on the identity of an SMSC, in the sent srifsm message it is necessary for the request module 13 to put the address of the system 4 of the invention, obviously stored in the configuration directory 10, at MAP level (protocol previously mentioned in the section on the description of the invention), such that the response provided by the HLR is directly sent to the system 4 of the invention.

The response message is collected by the receive and break down messages module 9, which obtains the VLR, IMSI and HLR network parameters in which the subscriber data is stored, passing this data to the request module 13 which performs the consultation with the mobile telephone network after processing the received information. This operation is carried out by tricking the network 3 such that the latter believes that the operation is carried out by a network node with the authority to carry out this operation that can attend to the subscriber request. It is thereby necessary to carry out a UL (Update-Location) MAP protocol operation, which is the message used for updating the subscriber's position, such that this message makes an HLR return information of the subscriber updating his position to a VLR. In order to perform this operation, it is necessary for the system 4 of the invention to simulate being the VLR in which the subscriber is located. The compose and send messages module 8 is therefore sent information about the operation to carry out a UL, the address of said VLR, the subscriber's IMSI and the HLR to which the operation must be sent, which were obtained in the previous step.

In order for the network 3 to believe that it is really the VLR performing the operation, the VLR address is placed at the MAP protocol level, and the address of the system 4 of the invention is placed at the SCCP protocol level, such that the network detects that the operation is carried out by the real VLR, but nonetheless, it detects that the response is to be sent to the system 4 of the invention. In this manner, the HLR attends to the request made by sending the response to the system 4, a response that is collected by the receive and break down messages module 9 which obtains the delivered parameters and passes them to the request management module 6. Thus, for example, if the TCP/IP machine were to request a supplementary services change instead of requesting subscriber parameters, after obtaining the previously described parameters from the srifsm message, instead of performing a MAP protocol UL operation, it would perform a supplementary service register, erase, activate or deactivate operation, depending on the operation the subscriber wishes to perform. For example, in the case in which the subscriber wishes to register a supplementary service, he sends a conventional register SS message, to erase he sends an erase SS message, to activate he sends an activate SS message, or deactivate SS in the case that he wishes to deactivate a supplementary service.

Once the request has been made in the case of a parameters consultation, the response corresponds to the value of the requested parameters, and in the case of a supplementary services change, the response is a confirmation that the change has been properly carried out. In either case, as previously mentioned, the request management module 6 returns the response to the protocol interface 5 corresponding to the protocol with which the request was initiated in the TCP/IP network 2.

Therefore, by means of the invention, a consultation or modification of at least one mobile telephone network subscriber parameter can be made in real time, and all this focused on the service as if it were accessing a conventional data base.

The invention claimed is:

1. A system for permitting a machine in a TCP/IP network to consult and/or modify subscriber parameters of mobile telephone network subscribers wherein the subscriber parameters are stored in a first node of said mobile telephone network which is separate from said system, and accessible from a second node of said mobile telephone network, said second node being authorized to obtain and/or modify said subscriber parameter in said first node, the system comprising:

a first interface unit, a data storage unit, and a data processing unit, wherein:

the first interface unit is operable to:

receive a request made by the machine in the TCP/IP network;

extract request parameters included in said request and which are necessary in order to attend to said request; and receive the requested data from the data storage unit and send the received data to the requesting machine as a response to the request, in the case that the request made is a consultation concerning a subscriber parameter;

the data storage unit is physically and functionally separate from said first node in said mobile telephone network, and operative to temporarily store subscriber parameter information obtained from said first node pertaining to each one of the different mobile telephone network subscribers;

the data processing unit is operative to obtain necessary mobile telephone network parameters for obtaining access to the subscriber parameter in said mobile telephone network to consult and/or modify said subscriber parameter in said mobile telephone network when said subscriber parameter to be consulted and/or modified is not contained in the data storage unit, said data processing unit comprises a request management module operative to:

detect when the request made cannot be attended to by the data storage unit, and responsive to such detection:

to generate a routing information request message for transmission to the mobile telephone network to access said first node of the mobile telephone network in which the subscriber is registered; and to obtain, in response, from said first node, routing parameters including the necessary mobile telephone network parameters;

said necessary mobile telephone network parameters include the identity of a second node of the mobile telephone network, said second node having authority to access the first node to obtain and/or modify said subscriber parameter.

2. A system according to claim 1, wherein the data processing unit further comprises:

a module operative to a compose and send messages;

a module operative to receive and break down messages from and to the mobile telephone network, respectively, and to send and receive different signals to and from said mobile telephone network.

3. A system according to claim 1, wherein the routing request message is a request for a short message sent to the first node, said routing request message indicating as an address of sender an address of the system to which the first node may send the routing parameters.

4. A system according to claim 3, wherein said routing request message is the message Send Routing Info For Short Messages.

5. A system according to claim 1, wherein the first node is a Home Location Register of the mobile telephone network.

6. A system according to claim 1, wherein access to said first node for obtaining and/or modifying said subscriber parameter in said first node is obtained using the Update-Location MAP protocol operation or any Supplementary Service MAP protocol operation.

7. A system according to claim 1, wherein the second node is a Visitor Location Register in which the subscriber is registered.

8. A system according to claim 1, wherein the interface unit comprises a protocol interface operative to receive and extract the request parameters in the request from the TCP/IP network.

9. A system according to claim 8, further including separate protocol interface units for each one of the protocols foreseen in the TCP/IP network, respectively to receive and extract the parameters according to the different protocols used in the TCP/IP network.

10. A system according to claim 8, wherein the request management module comprises a request control module arranged to collect the parameters provided by the parameter extraction operation of the interface unit, said request management module being operative to send the response to the request made to the protocol interface module; the request management module further comprising a module operative to transmit a request to the data storage unit to obtain said subscriber parameter when the request is a consultation of the latter.

11. A system according to claim 10, wherein the request management module also comprises a module operative to transmit requests to the mobile telephone network for making said request to the mobile telephone network after receiving a request order from the request control module, to carry said request through the compose and send module.

12. A system according to claim 1, wherein the data storage unit is arranged to store the consulted or changed subscriber parameters for a predetermined time period.

13. A system according to claim 1, further including a configuration directory wherein configuration data are stored for proper system functioning.

14. A system according to claim 1, wherein the request parameters received from the machine in the TCP/IP network include information regarding whether to access the data storage unit or to access the mobile telephone network directly by sending said routing information request message.

15. A process for accessing mobile telephone network subscriber information stored in a first node of the mobile telephone network from a TCP/IP network, wherein a mobile telephone network subscriber accesses a service by means of his mobile telephone, which in turn accesses a machine in the TCP/IP network to make a request to consult and/or modify a mobile telephone network subscriber parameter; the process comprising:
  transmitting said request to a system which connects the TCP/IP network and the mobile telephone network;
  temporarily storing subscriber parameter information previously obtained from said first node in a data storage unit which is part of said system, and separate from said first node;
  extracting, in said system, request parameters included in said request made by the machine, from said request;
  selectively accessing said data storage unit in said system to obtain a subscriber parameter pertaining to the mobile telephone network subscriber;
  obtaining and sending information regarding said parameter to the machine, in the case that the request made is a consultation regarding said stored parameter;
  when the subscriber parameter is not contained in the data storage unit, accessing the mobile telephone network by sending a routing information request message to the mobile telephone network to access said first node;
  in response to said routing information request message, obtaining from said first node, routing parameters including necessary mobile telephone network parameters for accessing the subscriber parameter in said first node, said necessary mobile telephone network parameters including the identity of a second mobile telephone network node with authority to access the first node;
  acquiring, from said routing parameters, said identity of the second mobile telephone network node; and
  using said identity, accessing said first node for obtaining and/or modifying a subscriber parameter in said first node.

16. A process according to claim 15, wherein the routing information request message is sent using, as sender identity, the identity of a Short Message Service Center.

17. A process according to claim 15, wherein the routing information request message is a request for a short message.

18. A process according to claim 17, wherein said routing request message for a short message is the message Send Routing Info For Short Messages.

19. A process according to claim 15, wherein the first node is a Home Location Register node of the mobile telephone network.

20. A process according to claim 15, wherein access to said first node for obtaining and/or modifying said subscriber parameter in said first node is obtained using the Update-Location MAP protocol operation or any Supplementary Service MAP protocol operation.

21. A process according to claim 15, wherein the second node is a Visitor Location Register node of the mobile telephone network.

22. A process according to claim 15, wherein, in the step of accessing said first node using said identity, the address of the second node, received from the first node, is sent at the Mobile Application Part MAP protocol level, and an address to which a response should be sent, is sent in the area of the Signal Connection Control Part SCCP protocol.

23. A system according to claim 1, wherein the routing information request message is configured to appear to the mobile telephone network that the message is being sent by the second node.

24. A process according to claim 15, wherein the step of sending a routing information request message to the mobile telephone network to access said first node is performed by configuring the message to appear to the mobile telephone network that the message is being sent by the second node.

* * * * *

UNITED STATES PATENT AND TRADEMARK OFFICE
CERTIFICATE OF CORRECTION

| | | |
|---|---|---|
| PATENT NO. | : 7,353,037 B2 | Page 1 of 1 |
| APPLICATION NO. | : 10/491737 | |
| DATED | : April 1, 2008 | |
| INVENTOR(S) | : Garcia Robles et al. | |

It is certified that error appears in the above-identified patent and that said Letters Patent is hereby corrected as shown below:

Title Page 1 Left-hand Column, under Item (73)
Change Assignee from "Vodaphone Group PLC" to --Vodafone Group PLC--

Signed and Sealed this
Sixth Day of May, 2014

Michelle K. Lee
*Deputy Director of the United States Patent and Trademark Office*